United States Patent
Ibrahim et al.

(10) Patent No.: US 10,142,184 B2
(45) Date of Patent: Nov. 27, 2018

(54) CENTRALIZED ARCHITECTURE FOR ESTABLISHING FEDERATIONS OF CONTENT DISTRIBUTORS

(71) Applicant: ORANGE, Paris (FR)

(72) Inventors: Ghida Ibrahim, Amsterdam (NL); Daniel Kofman, Saint Mande (FR)

(73) Assignee: ORANGE, Paris (FR)

( * ) Notice: Subject to any disclaimer, the term of this patent is extended or adjusted under 35 U.S.C. 154(b) by 223 days.

(21) Appl. No.: 14/781,285

(22) PCT Filed: Apr. 9, 2014

(86) PCT No.: PCT/FR2014/050855
§ 371 (c)(1),
(2) Date: Sep. 29, 2015

(87) PCT Pub. No.: WO2014/167250
PCT Pub. Date: Oct. 16, 2014

(65) Prior Publication Data
US 2016/0308730 A1    Oct. 20, 2016

(30) Foreign Application Priority Data
Apr. 10, 2013   (FR) ..................... 13 53215

(51) Int. Cl.
*H04L 12/24*     (2006.01)
*H04L 29/06*     (2006.01)
*H04L 29/08*     (2006.01)

(52) U.S. Cl.
CPC ........ *H04L 41/142* (2013.01); *H04L 65/4084* (2013.01); *H04L 65/80* (2013.01); *H04L 67/1002* (2013.01); *H04L 67/2838* (2013.01); *H04L 67/327* (2013.01)

(58) Field of Classification Search
CPC ... H04L 41/142; H04L 65/4084; H04L 65/80; H04L 67/1002; H04L 67/2838; H04L 67/327
See application file for complete search history.

(56) References Cited

U.S. PATENT DOCUMENTS

| 8,117,216 B1 | 2/2012 | Sakata et al. | |
| 8,117,276 B1 * | 2/2012 | Sakata | G06F 9/541 709/213 |
| 9,438,444 B1 * | 9/2016 | Middleton | G06F 9/541 |

(Continued)

OTHER PUBLICATIONS

Peterson L. et al., "Framework for CDN Interconnection; draft-ietf-cdni-framework-03.txt", Aug. 23, 2013, pp. 1-55.
International Search Report from PCT/FR2014/050855.

*Primary Examiner* — Michael C Lai
(74) *Attorney, Agent, or Firm* — Haverstock & Owens LLP

(57) ABSTRACT

The invention relates to a method of establishing one or more federations for content distribution in a system comprising a plurality of content providers (CSPm) and a plurality of content distributors (CDAj), the method comprising a step (130), implemented by an intermediate entity (INT) distinct from said content providers and from said content distributors, of associating at least one of said content providers with at least one of said content distributors as a function of parameters provided to the intermediate entity by said content providers and of parameters provided to the intermediate entity by said content distributors.

14 Claims, 2 Drawing Sheets

(56) References Cited

U.S. PATENT DOCUMENTS

Figure 3:
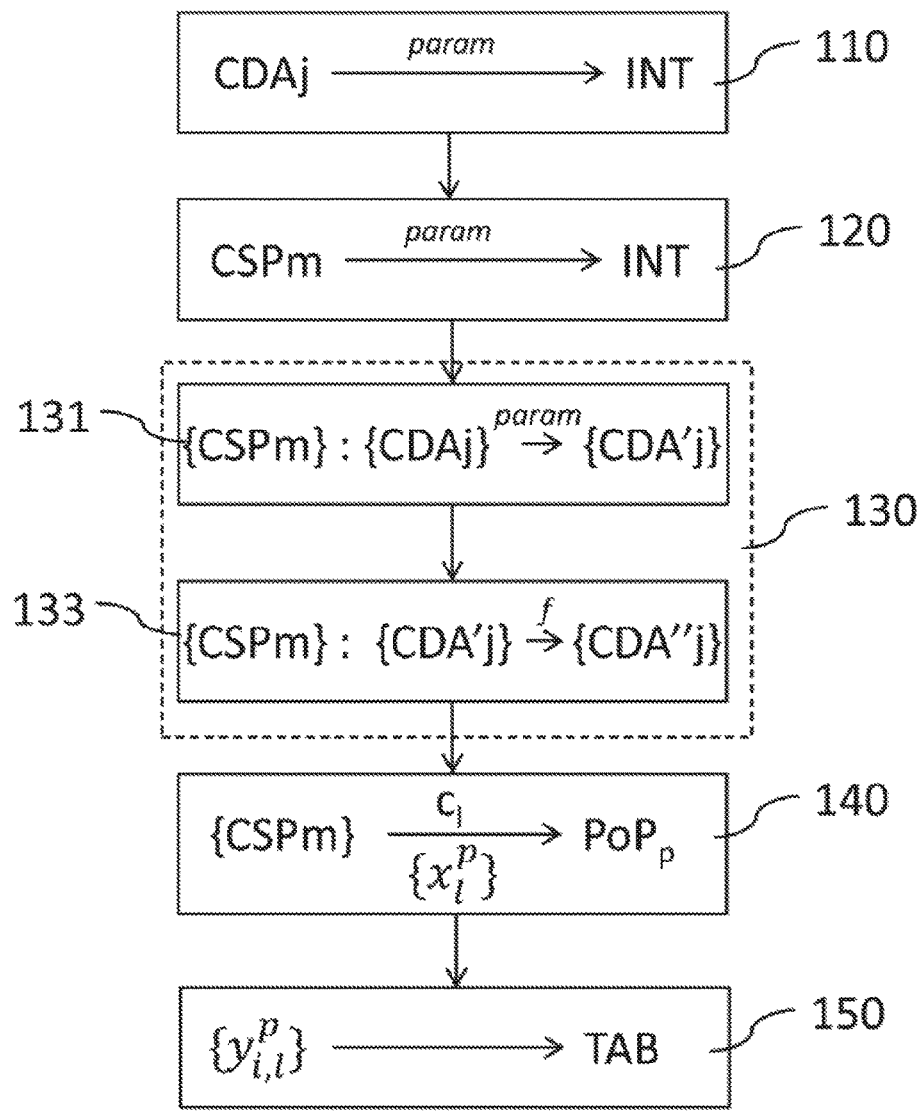

| | | | |
|---|---|---|---|
| 2006/0161635 A1* | 7/2006 | Lamkin | G06F 17/30041 |
| | | | 709/217 |
| 2009/0182815 A1* | 7/2009 | Czechowski, III | H04L 67/104 |
| | | | 709/206 |
| 2012/0215779 A1* | 8/2012 | Lipstone | G06F 17/30035 |
| | | | 707/737 |
| 2014/0052822 A1* | 2/2014 | Rodriguez Rodriguez | |
| | | | H04L 67/1008 |
| | | | 709/218 |

* cited by examiner

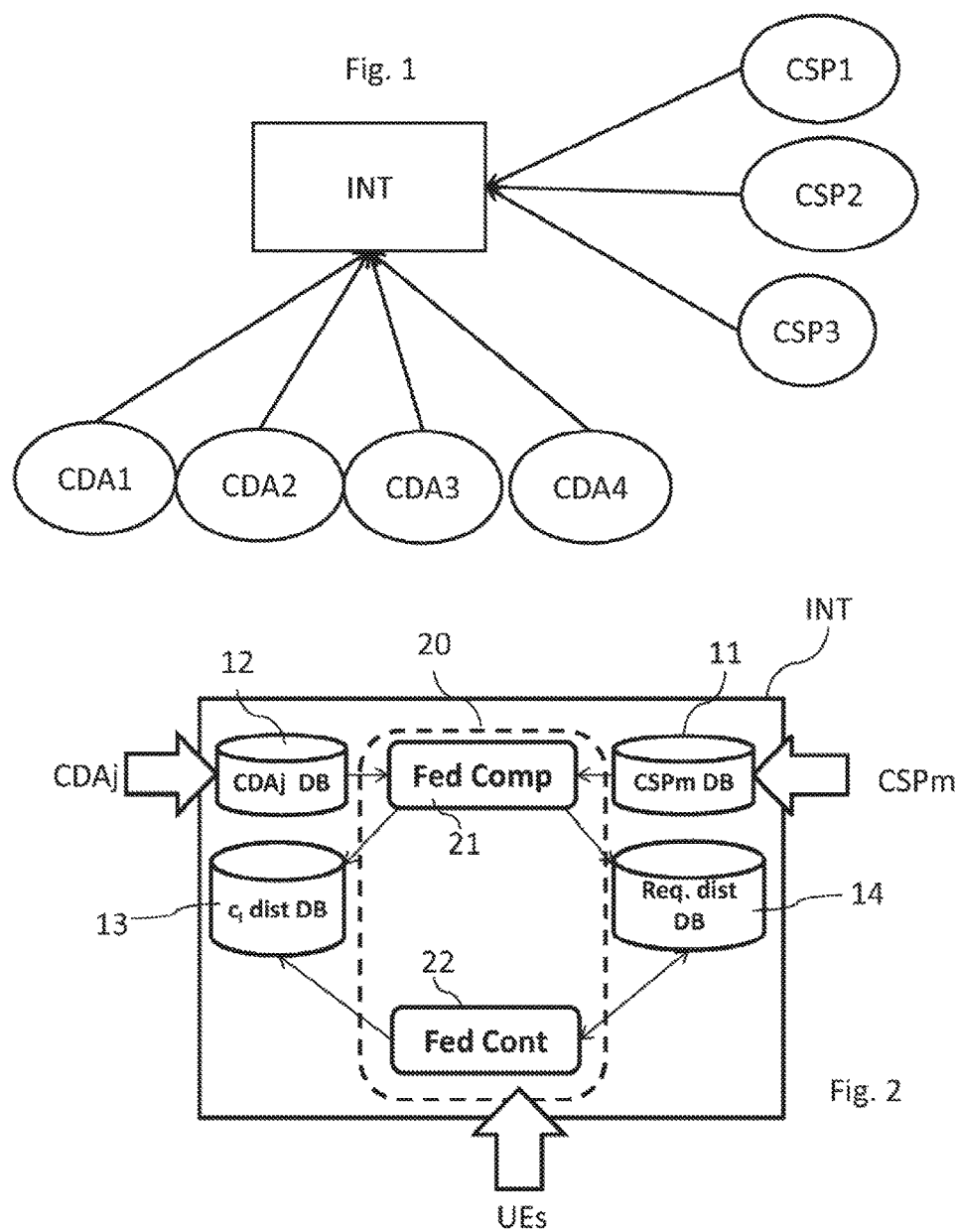

CENTRALIZED ARCHITECTURE FOR ESTABLISHING FEDERATIONS OF CONTENT DISTRIBUTORS

The present invention relates to the field of the federating of content distributors for the delivery to end users of digital contents supplied by content providers.

Historically, the distribution of digital contents was based on a model involving four types of players in the value chain:
- the content providers (e.g. YouTube, Daily Motion, Netflix) providing a wide audience, directly or indirectly, with digital contents;
- the content distributors, or CDN providers (e.g. Akamai), capable of lightening the load of the content providers and speeding up the delivery of their contents;
- the network operators, such as, for example, transit players or telecoms operators in charge of the local loop, who make the contents accessible for the end users;
- the end users who consume the digital contents.

The explosion of digital traffic causes congestion problems, both in the domains of the network operators and in the interconnections between these various players, resulting in higher interconnection costs and a degradation of the quality of service in the network. This obliges the content providers and the CDN players to seek a compromise between an internal extension of their content delivery platforms and the delegation of this delivery to new players, and therefore to redefine their economic models.

For these reasons, the ecosystem of digital content distribution is in the process of changing from a scenario with one or two major players monopolizing the distribution and the delivery of contents (e.g. a single content provider associated with a single global CDN network) to a scenario with a federation of multiple heterogeneous players capable of addressing the abovementioned issue of the explosion of traffic, the latter scenario being reinforced by the emergence of new players on the markets of the CDN networks and of the cloud, and the progress of the virtualization and resource sharing techniques.

The issue of dynamic management of established federations of content distributors has already been addressed. However, in the actual establishment of these federations, that is to say the initial choice of the content distributors to be associated, and in the content placement and load sharing strategies, the decision to establish these federations is generally taken either by a content provider, or by a global CDN referred to as "upstream" CDN.

In the first case, the content provider chooses two or more CDN players, having great capacity and a global coverage, places all its digital contents with each of these CDN players and delegates to an intermediate agent (or "broker"), the dynamic redirection of the users to a particular CDN player based on QoE, geolocation and/or cost criteria. In the second case, an "upstream" CDN player chooses a local CDN player, called "downstream" CDN, for each coverage zone as a function of cost and capacity criteria, and redirects the requests that it receives to the closest "downstream" CDN network.

These two cases present a certain number of drawbacks. In effect, the decision-making process relies on the communication of critical information, such as the capacity or the billing model, whether it be by the CDN players to a content provider or by the local CDN players to an upstream CDN player, information that the CDN players are not keen to divulge for reasons of confidentiality or of competition on the CDN market.

Furthermore, the deciding content provider or the upstream CDN network does not have sufficient visibility of all of the candidates CDNs, in particular the emergent CDNs on the market such as the Telecom operators.

Finally, the static decision-making is very simplistic (to place all the contents in all the CDNs of the federation, to redirect the requests to the closest CDN, to rely only on dynamic criteria in the redirection, etc). Thus, it is not suited to complex scenarios in which the candidate CDNs are becoming increasingly numerous and distributed and have limitations in terms of storage and/or streaming capabilities.

The object of the present invention is to remedy the abovementioned drawbacks and to this end it proposes a method for establishing content distribution federations in a system comprising a plurality of content providers and a plurality of content distributors, the method comprising a step of association, implemented by an intermediate entity distinct from said content providers and from said content distributors, of at least one of said content providers with at least one of said content distributors based on parameters supplied by said content providers to the intermediate entity and of parameters supplied by said content distributors to the intermediate entity.

By leaving it up to a third party intermediary to collect the necessary information, both on the side of the content providers and on the side of the content distributors, it is possible to use sensitive information that these players would not have exchanged, directly between them, in order to fairly and optimally provide for a content distribution federation between these players. This intermediary can, furthermore, have a greater visibility as to the new content distributors emerging on the market that a content provider does not directly have.

According to an embodiment in which the parameters supplied by said content providers comprise, for each content provider, at least one first technical indicator, relative to a technical characteristic concerning a digital content by the content provider, and the parameters supplied by said content distributors comprise, for each content distributor, at least one second technical indicator, relative to the technical capability of the content distributor to deliver a digital content, the method further comprises the preselection, for at least one of said content providers, of at least one candidate content distributor out of said content distributors, based on a comparison between the first and the second technical indicators, and the selection, out of the preselected candidate content distributors, of at least one content distributor associated with said at least one content provider.

It is thus possible to provide for a content distribution federation that reconciles the technical needs of the contents supplied by the content providers and the technical possibilities offered by the content distributors, for example in terms of type of coding supported and delivery protocol, without having to exchange this type of sensitive information between these various players, who are potentially competitors.

According to an advantageous feature, the first technical indicator is an indicator of the transmission protocol used by the content provider to supply a digital content, and the second technical indicator is an indicator of a transmission protocol supported by the content distributor, in order to guarantee the compatibility of the transmission protocols employed within a particular federation.

According to another advantageous feature, the first technical indicator is an indicator of a coding format used by the content provider to encode a digital content and the second technical indicator is an indicator of a coding format supported by the content distributor, in order to guarantee the compatibility of the coding formats employed within a particular federation.

In one embodiment, the parameters supplied by said content providers comprise, for each content provider, an indicator of service coverage, relative to a service supply zone targeted by said content provider, and the parameters supplied by said content distributors comprise, for each content distributor, an indicator of distribution coverage, relative to a content distribution zone covered by said content distributor, the preselection then being performed also based on the comparison between said service coverage indicators and said distribution coverage indicators.

It is thus possible to provide for a content distribution federation that reconciles the needs of the content providers and the possibilities of the content distributors, in terms of administrative or geographic coverage, without having to exchange this type of sensitive information between these various players.

According to an advantageous feature, the selection also comprises the following steps:

determining, for at least one point of presence of each candidate content distributor, a content distribution indicator, indicating if the presence in said point of presence of a digital content supplied by said content provider makes it possible to maximize a federation margin function; and selecting, from the candidate content distributors, at least one content distributor comprising a point of presence having a non-zero content distribution indicator.

It is thus possible to refine the provisioning of a federation of content distributors by taking account of the costs and of the revenues involved at the level of the content distributors and of the limitations in terms of capacity of these distributors.

In one embodiment, the method further comprises the storage of a digital content in the points of presence of the selected content distributors having a non-zero content distribution indicator for said content.

According to another advantageous feature, the method further comprises the following steps:

determining a load distribution indicator representing the manner in which a request originating from a determined zone, for a digital content supplied by said content provider, is redirected to a point of presence of a candidate content distributor, based on said federation margin function;

designating, in a routing table, by means of said load distribution indicator, a selected content distributor to which to route a request for said digital content originating from said determined zone.

It is thus possible to manage the routing of the requests received within the federation in such a way as to take account of the costs and of the revenues involved at the level of the content distributors as well as the streaming capacity of these various players.

In a particular embodiment, these content distribution and load distribution indicators are determined by maximizing the following federation margin function:

$$f = \alpha[y_{i,l}^p] - \beta[x_p^l],$$

in which:

$x_p^l$ is the content distribution indicator relative to the presence of a content $c_l$ in the point of presence $PoP_p$;
$y_{i,l}^p$ is the load distribution indicator representing the probability that a request originating from a zone $Z_i$, for a content $c_l$, be redirected to a point of presence $PoP_p$;
$\alpha$ is a matrix whose coefficients depend at least on a technical criterion out of the average bit rate of a content belonging to said content provider, the number of sessions served by said content provider over a determined duration, the distribution of the demand and of the popularity of contents over the different zones of the coverage imprint of said content provider;
$\beta$ is a vector whose coefficients depend on the average size of a content belonging to said content provider.

Also proposed is an entity for establishing a content distribution federation between a plurality of content providers and a plurality of content distributors, this entity comprising:

storage means in which are stored a plurality of parameters supplied by said content providers and a plurality of parameters supplied by said content distributors;

processing means configured to recover the parameters stored in the storage means and associate at least one of said content providers with at least one of said content distributors, based on said parameters supplied by said content providers and said parameters supplied by said content distributors, in order to form one or more federations of content distributors.

The present invention also proposes a system for distributing digital contents comprising a plurality of content providers, a plurality of content distributors and the above intermediate entity, in which:

the content providers are configured to send parameters to the intermediate entity;

the content distributors are configured to send parameters to the intermediate entity;

the intermediate entity is configured to associate at least one of said content providers with at least one of said content distributors, based on said parameters supplied by said content providers and said parameters supplied by said content distributors, in order to form a federation of content distributors.

According to a particular implementation, the various steps of the method for establishing federations according to the invention are implemented by software or a computer program, this computer program comprising code instructions for the implementation of the method for establishing a federation of content distributors as described previously, when this program is executed by a data processor.

This program can use any programming language, and be in the form of a source code, object code, or intermediate code between source code and object code, such as in a partially compiled form, or in any other desirable form.

The invention also targets a computer medium, that can be read by a computer or a data processor, and comprising instructions of a program as mentioned above. This computer medium can be any entity or device capable of storing the program. For example, the medium can comprise a storage means, such as a ROM, for example a CD ROM or a microelectronic circuit ROM, or even a magnetic recording means, for example a diskette or a hard disk. Also, this computer medium can be a transmissible medium such as an electrical or optical signal, which can be routed via an electric or optical cable, by radio or by other means. The program according to the invention can in particular be downloaded over a network of internet type. Alternatively, this computer medium can be an integrated circuit in which the program is incorporated, the circuit being adapted to execute, or to be used in the execution of, the method concerned.

Other features and advantages of the invention will become apparent on reading the following detailed description of particular embodiments, given as nonlimiting examples, and the attached figures in which:

FIG. 1 schematically represents a control architecture making it possible to federate content distributors and in which the present invention is implemented;

FIG. 2 illustrates an intermediate entity according to an embodiment of the invention; and FIG. 3 illustrates the steps of the method for establishing a federation of content distributors according to an embodiment of the invention.

Reference is made first of all to FIG. 1 which illustrates a control architecture for establishing and managing federations of content distributors. The present invention is implemented in the context of this architecture.

The proposed control architecture serves as intermediary between a first category of players, called "content distributors" ("content distribution actor" or CDA), and another category of players called "content providers" ("content service provider" or CSP).

The content providers (here designated CSP1 to CSP3, without the invention being limited to this particular number of content providers) have a catalog of digital contents (these contents can be video, audio or other contents) having particular technological constraints (coding format, transmission protocol). Also, each content provider has constraints in terms of coverage, of demand and of popularity that it wants to address by delegating the distribution of its contents to one or more content distributors.

The content distributors (here designated CDA1 to CDA4, without the invention being limited to this particular number of content distributors) offer their particular strengths in terms of capacity (storage and broadcasting/streaming) and of diversity (geographic coverage) in order to participate in a federation of content distributors which jointly meets the constraints of the providers CSPm by delivering their contents to the end users.

Each CDAj has one or more points of presence $PoP_p$, themselves comprising one or more storage and broadcasting nodes. Each point of presence $PoP_p$ covers one or more geographic zones $Z_i$ (e.g. a country or a region) or administrative zones (e.g. of a standalone system such as a network managed by a telecommunications operator). Thus, a content distributor CDAj can equally be a local player, with a single point of presence and a restricted geographic coverage, and a global player, with a multitude of points of presence and a wide geographic coverage (a number of zones).

An intermediate entity INT (or "broker"), that can take the form of a server incorporating the functions described hereinbelow and interacts with the CSPm and the CDAj as independent third party. This entity makes it possible to construct one or more federations of content distributors capable of best meeting the service needs of the various CSPms.

FIG. 2 gives a more detailed illustration of this intermediate entity according to an embodiment of the invention.

This entity INT comprises in particular processing means 20 (e.g. a data processing processor), executing instructions for implementing the establishment and the control of federations of content distributors, and storage means (e.g. in the form of a database) in which are stored a certain quantity of information and parameters used by the processing means for the abovementioned establishment and control of federations.

These storage means notably comprise a first database 11 in which are stored parameters supplied by the content providers CSPm wishing to extend their platform and/or their coverage. These parameters can notably be as follows, for each content provider CSPm:

1) a service coverage parameter, relative to the service provision zone(s) targeted by the provider CSPm with respect to its service offering (in other words its "service imprint"). This imprint e can be expressed in the form of one or more zones Zi representing distinct geographic zones (e.g. countries or regions with boundaries) or administrative zones (e.g. for autonomous systems AS);

2) technical indicators, relative to technical characteristics concerning a content supplied by the provider CSPm. Among these technical indicators there are:
  the coding format(s) of digital contents (e.g. MPEG4 for a video to be broadcast) of the provider CSPm;
  the transmission protocol(s) (e.g. RTP or http) used by the provider CSPm to deliver its contents;
  possibly an identification of the type of contents (video, audio, html page, video games, etc.) delivered by the provider CSPm;

3) other information relative to the demand of the end users for the contents of a provider CSPm, such as:
  the list $C_m$ of the contents $c_l$ supplied the content provider CPSm;
  the number $K_m$ of sessions served per month by the provider CSPm;
  the distribution $D_i^m$ of the demand for contents over the different zones Zi of the service coverage imprint of the provider CSPm;
  the popularity $V_i^l$ of a content $c_l$ in a zone $Z_i$ of the service coverage imprint of the provider CSPm;
  the mean bit rate $MBCU_m$ of a content belonging to the provider CSPm ("Mean Bitrate of a Content Unit");
  the mean size $MVCU_m$ of a content belonging to the provider CSPm ("Mean Volume of a Content Unit");
  the mean duration $MDCU_m$ of a content belonging to the provider CSPm ("Mean Volume of a Content Unit").

The storage means of the entity INT also comprise a second database 12 in which are stored parameters supplied by the content distributors CDAj wishing to federate with other players. These parameters can notably be as follows, for each content distributor CDAj:

1) technical indicators, relative to technical characteristics concerning the technical capacity of the distributor CDAj to deliver a given digital content. Among these technical indicators there are:
  the transmission protocol(s) (e.g. RTP or http) supported by the distributor CDAj to deliver digital contents;
  the digital content coding format(s) (e.g. MPEG4 for a video to be broadcast) supported by the distributor CDAj;

2) a distribution coverage parameter, relative to the distribution zone(s) covered by the distributor CAj (in other words, its "distribution imprint"). Just as for the service imprint, the distribution imprint can be expressed in the form of one or more zones Zi representing distinct geographic zones (e.g. countries or regions with boundaries) or administrative zones (e.g. for autonomous systems);

3) other information relative to the technical capacity of the distributor CDAj, such as:
  the number of "points of presence" $PoP_p$ that the distributor CDAj has, for example in the form of a list $PoPList_j$ of points of presence;
  the storage capacity $SC_p$ of a point of presence $PoP_p$, for all the points of presence of the distributor CDAj;
  the streaming capacity $PC_p$ of a point of presence $PoP_p$, for all of the points of presence of the distributor CDAj;
  the distance $Dis_p^i$ between a point of presence $PoP_p$ and a zone $Z_i$.

4) other information relative to economic characteristics of the distributor CDAj such as the pricing $F_j^i$ applied by the distributor CDAj to distribute a content to a zone Zi of its distribution imprint (expressed for example per unit of content, for example for 1 Mbps).

The different parameters stored in the databases 11 and 12 are used as input parameters for an algorithm executed in the processing means 20 (this algorithm being detailed later), which supplies output parameters intended to be stored in two other databases 13 and 14 forming part of the storage means.

The database 13 is notably used to store the content distribution parameters generated. These parameters give information on the placement of the contents $c_i$ belonging to the different CSPms on the different CDAjs. The database 14 is, itself, used to store the load distribution parameters. These parameters are used to take decisions on the routing of the requests coming from the end users to the different CDAjs.

The processing means 20 notably comprise a federation establishment engine 21 and a federation control engine 22 (these two engines being able to be implemented typically in the form of a computer program whose instructions are stored in a memory associated with a processor capable of executing these instructions).

The engine 21 implements the method for establishing federations based on the parameters stored in the databases 11 and 12. This method, detailed hereinbelow, consists in establishing federations of CDAjs, each composed of a set of CDAjs aiming to jointly meet the demand of a set of CSPms, in order to associate these players within a particular federation. The engine 22 is capable of dynamically controlling the federations of content distributors, established statically and previously using the engine 21, based on parameters stored in the databases 13 and 14.

Reference is now made to FIG. 3 which illustrates a method for establishing a federation of content distributors according to an embodiment of the present invention.

In this method, during a preliminary step 110, the different content distributors CDAj, wanting to participate in a federation of content distributors, supply some, even all, of the parameters described previously (notably their distributor imprint parameters, the content coding formats supported and the transmission protocols supported) to the intermediate entity INT, by sending them in messages in digital formats to the latter, for example after subscribing to a federation service offered by the entity INT. These parameters are then stored in the database 12 of the entity INT.

In another preliminary step 120, the different content providers CSPm, wanting to benefit from storage and delivery capacities within a federation of content distributors, supply some, even all, of the parameters described previously (notably their service provision imprint parameters, the coding formats of the digital contents that they make available and the transmission protocols used to supply them) to the intermediate entity INT, by sending them in messages in digital formats to the latter, for example after subscribing to a federation service offered by the entity INT. These parameters are then stored in the database 11 of the entity INT.

Once the intermediate entity INT has, in its databases 11 and 12, parameters supplied both by the content distributors CDAj wanting to offer their capacity and by the content providers CSPm wanting to benefit therefrom, the intermediate entity INT can associate a certain number of these providers CSPm with a certain number of these distributors CDAj, in order to form a federation, and do so on the basis of these parameters (step 130) of which only the entity INT has overall knowledge.

In one embodiment, to proceed with this association in order to form a federation, the entity INT classifies the content providers CSPm in groups of providers {CSPm}, based on the technical criteria related to the nature of their contents and/or their service imprint. Typically, the CSPms that have similar technical criteria and/or the same service imprint belong to a same group. The entity INT then proceeds with a phase of preselection of content distributors (step 131) corresponding to this group. During this phase, out of all the content distributors, only those which make it possible to meet the technical constraints of a certain group {CSPm} will be preselected.

In this preselection phase, one or more technical indicators relative, for each provider CSPm of the group {CSPm}, to a technical characteristic of a content $c_i$ supplied by this provider SPm, and one or more technical indicators relative, for each distributor CDAj, to the capacity of this distributor CDAj to support a technical characteristic specific to a digital content. More specifically, the entity INT compares, for one or more providers CSPm, its technical indicators with the technical indicators supplied by the distributors CDAj, in order to determine the distributors CDAj whose technical characteristics are compatible with those of this or these provider(s) CSPm.

The distributors CAj that meet this condition are then preselected, are called "candidates" and are designated by a group {CDA'j} which forms a subset of all of the distributors {CDAj}. From the CDA'js that are present in the group {CDA'j}, there are then chosen the distributors CDA"j which effectively participate in a federation targeting a certain group of CSPms (step 133). The selected candidates form a group {CDA"j} associated with the provider(s) CSPm of the group {CSPm} within a particular federation.

Out of the technical indicators used in this preselection, the technical indicators relative to the transmission protocol are advantageously used, in order to guarantee a federation whose candidate distributors CDA'j and supplier(s) CSPm use a same transmission protocol to deliver contents.

The technical indicators relative to the coding format (used to encode a content $c_i$ on the side of the supplier(s) CSPm and supported by the distributors CDAj) can also be used, in order to guarantee a federation in which the candidate distributors CDA'j support the type of coding of the contents that they undertake to deliver, in order to be able to process them.

The entity is INT can likewise use the coverage indicators (service imprint for the provider(s) CSPm and distribution imprint for the distributors CDAj), designating the geographic or administrative zones covered by the CSPms and the CDAjs in order to associate, within a particular federation, providers CSPm with distributors CDAj whose coverage area is included in (even equal to) the coverage zone of these providers CSPm.

Once the candidate distributors CDA'j have been preselected by means of the abovementioned parameters, the distributor(s) CDA"j to be associated with the provider(s) CSPm can then be selected (step 133) from the candidates CDA'j.

All the candidate distributors CDA'j can thus be selected, if only the criteria relative to the indicators used in the preselection are to be applied. However, it is advantageous at this stage to perform a more strict selection process, in order to exclude certain candidate distributors that do not meet other technical criteria, even economic criteria (e.g. billing), and do so fairly between the candidate distributors.

The selection procedure that takes place during the step 133 could be implemented by introducing the following two variables:

- a content distribution indicator $x_p^l$ (implemented in the form of a binary variable) which indicates, for a given point of presence PoPp belonging to a candidate distributor CDA'j, if a digital content $c_l$, supplied by the provider CSPm, is actually present (in the case of such a positive result, $x_p^l=1$) or not (in this negative case, $x_p^l=0$) in this point of presence PoPp. This indicator is used to take a decision at an instant t0 as to where to place a given content $c_l$ in a federation.
- a load distribution indicator $y_{i,i}^p$ (implemented in the form of a linear variable of between 0 and 1) specifying, for a point of presence PoPp, the probability that a request originating from a geographic zone $Z_i$ and targeting a digital content cl can be redirected to this point of presence PoPp. This indicator is used to populate a routing table which is used subsequently by the intermediate entity INT to take dynamic request routing decisions.

There is also introduced a function $f$, called "federation margin function", which represents the margin, in terms of technical gain relative to the technical costs, of a federation of content distributors {CDA'j}. This margin is a function of the strategy for distributing contents and requests belonging to a group of CSPms {CSPm} in different players of the federation.

This function $f$ can take the following form:

$$f=\alpha[y_{i,i}^p]-\beta[x_p^l]$$

in which:
- $\alpha$ is matrix whose coefficients depend on a certain number of technical parameters, such as the mean bit rate of a content belonging to a provider CSPm, the distribution of the demand and the popularity of the contents of a certain CSPm per zone, and economic criteria such as the billing applied by a distributor CDAj in the different zones.
- $\beta$ is a vector whose coefficients depend on a certain number of technical parameters, such as the mean size of the contents belonging to a provider CSPm, and economic criteria such as the mean storage cost for a certain quantity of data by the distributor CDAj.

In particular, the individual coefficients $\alpha_{ij}^{ml}$ and $\beta_m$ of the matrix $\alpha$ and of the vector $\beta$ can be expressed as follows, based on the parameters previously introduced and stored in the databases 11 and 12 of the entity INT:

$$\alpha_{ij}^{ml}=MBCU_m \times K_m \times D_i^m \times (F_j^i - Cproc - Cband_i^j \times Dis_p^i) \times V_i^l$$

$$\beta_m = Cstor \times MVCU_m$$

in which, in addition to the parameters already mentioned:
Cstor is the mean cost of storage of a determined quantity of data (e.g. 1 Gb) in the distributor CAj for a determined datum (e.g. 1 month);
Cproc is the mean cost of streaming of a determined bit rate of data (e.g. 1 Mbps) by the distributor CAj, this cost depending on the computational resources (CPU) of the hardware architecture of this distributor;
$Cband_i^j$ is the mean cost to route a determined bit rate of data (e.g. 1 Mbps) through an intermediate network (administratively independent autonomous system) situated between the distributor CAj and a determined geographic or administrative zone $Z_i$.

The entity INT thus uses this function $f$ to determine the indicators $x_p^l$ and $y_{i,i}^p$ corresponding to the different points of presence PoPs, contents $c_l$ and zones $Z_i$ that make it possible to maximize the federation margin function $f$. Once computed, these indicators are then used to effectively distribute the contents within a federation (and thus exclude the candidate distributors CDA'j in which no content is distributed) and manage the routing of the requests from users to the contents stored in this federation.

During this process of maximization of this function $f$, a certain number of constraints can be taken into account. These include:

1) A constraint on the storage capacity of the distributors CAj, expressed as follows:

$$\sum_m \sum_l MVCU_m \times x_p^l \leq SC_p \; \forall \, p \in U_j \, PoPList_j$$

in which:
$m \in SPList$, list of the CSPms belonging to a same group {CSPm} and for which a federation is required to be established;
$l \in C_m$, list of the contents $c_l$ belonging to a provider CSPm;
$PoPList_j$ is the list of the points of presence $PoP_p$ of a content distributor CDAj.

2) A constraint on the broadcasting ("streaming") capacity of the distributors CDAj, expressed as follows:

$$\Sigma_m \Sigma_i \Sigma_l \mu_i^{ml} \times y_{i,i}^p \leq PC_p \times T \; \forall p \in U_j PoPList_j$$

in which, in addition to the parameters already defined above:
$\mu_i^{ml}$ is a parameter such that:

$$\mu_i^{ml}=MBCU_m \times K_m \times D_i^m \times MDCU_m \times V_i^l$$

3) A constraint of fairness between participants in the federation of content distributors.

This last fairness constraint aims to define a federation strategy which guarantees each participant in the federation a "fair" revenue. This revenue depends, on one side, on the particular technical strengths of the participant concerned, in terms of capacity and geographic diversity, and, on the other side, on its positioning in terms of billing relative to other players with similar characteristics (e.g. covering the same zone). A number of fairness strategies are possible ("Shapley value" in gaming theory, "Min-max fairness", etc.). This constraint can be expressed as follows:

$$\sum_m \sum_p \sum_i \sum_l \Omega_{ij}^{ml} \times y_{il}^p \geq Xeta_j \times MaxRev_j \forall \, j \in CDNList$$

in which, in addition to the parameters defined above:
$Xeta_j$ is a parameter between 0 and 1 which depends on the billing strategy of the distributor CDAj (billing more or less than the others);
$MaxRev_j$ is the maximum revenue which could be obtained by a distributor CDAj in the framework of the federation, given its existing capacity and coverage. This revenue is obtained if the technical contribution of the distributor CDAj to the federation is optimal (CDAj uses its existing capacity in the most effective way possible in order to maximize its revenue);

$\Omega_{i,j}^{ml}$ is a parameter such that $\Omega_{ij}^{ml}=MBCU_m \times K_m \times D_i^m \times F_j^i \times V_i^l$ Once the indicators $x_p^l$ have been determined, the entity INT selects (step 133), from the candidate distributors CDA'j, those which have at least one point of presence $PoP_p$ that has at least one non-zero indicator $x_p^l$ ($x_p^l=1$).

In other words, only the candidate distributors CDA'j that allow for an optimal distribution of the contents to be delivered, in terms of federation margin, are retained (these players then form a subset {CDA"j} of {CDA'j}) and participate in a federation targeting a group {CSPm} of content providers. Each content $c_l$ belonging to a CSPm of the group {CSPm} is then transmitted to the CDA"j that have at least one point of presence $PoP_p$ for which $x_p^l=1$ (step 140).

Furthermore, a routing table TAB is determined (step 150) to make it possible to route requests received from end users, for a digital content stored in the federation, to the right content distributor. The routing decision depends on the load distribution indicators y°. These indicators are computed in such a way as to take into account, on the one hand, the distance between the user and the point of presence $PoP_p$ from which the requested content will be served and, on the other hand, the presence of this content at this selected point of presence $PoP_p$.

This can be expressed in this table TAB as follows: a content distributor CDA"j, selected within a federation, is associated with each request r characterized by a requested content $c_l$ and an origin zone $Z_i$. The content distributor concerned needs to have at least one point of presence $PoP_p$ which is sufficiently close to the zone $Z_i$ and in which the content $c_l$ is stored.

The steps 130 to 150 described previously can be implemented perfectly well to associate content distributors with a single content provider, but are particularly appropriate when there is a need to associate a plurality of content distributors with a plurality of content providers. In the latter case, in a particular embodiment, the content providers can be classified in distinct groups for each of which a federation is formed.

The steps 130 to 150 described previously relate to the management of a first phase, called "static", at an instant t0, during which one or more federations are established, independently and fairly, by the intermediate entity INT, by means of its federation establishment engine 21. Naturally, once these federations are established, the intermediate entity INT dynamically manages these federations during a second phase, called "dynamic", by means of its federation control engine 22, which notably uses the content load indicators, stored in the database 14, and the routing table TAB populated by means of the indicators $y_{i,j}^p$, to route the requests from the end users to the points of presence of the federation where the requested contents are located.

Obviously, the invention is not limited to the exemplary embodiments described and represented above, from which it will be possible to provide other modes and other embodiments, without in any way departing from the scope of the invention.

The invention claimed is:

1. A method for establishing a content distribution federation of content providers and content distributors, in a system comprising a plurality of content providers and a plurality of content distributors, the method comprising:
   supplying first parameters from the content providers to an intermediate entity distinct from said content providers and said content distributors, the first parameters comprising, for at least one of said content providers, at least one first technical indicator relative to a technical characteristic concerning a digital content provided by the content provider;
   supplying second parameters from the content distributors to said intermediate entity, the second parameters comprising, for at least one of said content distributors, at least one second technical indicator relative to a technical capability of the content distributor to deliver a digital content;
   preselecting, for at least one of said content providers, at least one candidate content distributor out of said content distributors, based on a comparison between the first and second technical indicators; and
   selecting, from the preselected candidate content distributors, at least one content distributor to be associated with at least one content provider;
   associating, by said intermediate entity, said at least one content providers with the selected at least one content distributors; and
   establishing a content distribution federation of content providers and content distributors, said content distribution federation comprising the associated at least one content providers and selected at least one content distributors.

2. The method as claimed in claim 1, in which the at least one first technical indicator is an indicator of the transmission protocol used by the content provider to supply a digital content, and the at least one second technical indicator is an indicator of a transmission protocol supported by the content distributor.

3. The method as claimed in claim 2, in which the at least one first technical indicator is an indicator of a coding format used by the content provider to encode a digital content and the at least one second technical indicator is an indicator of a coding format supported by the content distributor.

4. The method as claimed in claim 1, in which the at least one first technical indicator is an indicator of a coding format used by the content provider to encode a digital content and the at least one second technical indicator is an indicator of a coding format supported by the content distributor.

5. The method as claimed in claim 1, in which:
   the first parameters comprise, for each content provider, a service coverage indicator, relative to a service provision zone targeted by said content provider;
   the second parameters comprise, for each content distributor, a distribution coverage indicator, relative to a content distribution zone covered by said content distributor;
   the preselection being performed also based on the comparison between said service coverage indicators and said distribution coverage indicators.

6. The method as claimed in claim 1, in which the selection comprises:
   determining, for at least one point of presence of each candidate content distributor, a content distribution indicator, indicating if the presence in said point of presence of a digital content supplied by said content provider allows maximization of a federation margin function; and
   selecting, from the candidate content distributors, at least one content distributor comprising a point of presence having a non-zero content distribution indicator.

7. The method as claimed in claim 6, further comprising storage of a digital content in the points of presence of the selected content distributors having a non-zero content distribution indicator for said content.

8. The method as claimed in claim 7, further comprising:
determining a load distribution indicator representing the manner in which a request originating from a determined zone, for a digital content supplied by said content provider, is redirected to a point of presence of a candidate content distributor, based on said federation margin function;
designating in a routing table, by means of said load distribution indicator, a selected content distributor to which to route a request for said digital content originating from said determined zone.

9. The method as claimed in claim 6, further comprising:
determining a load distribution indicator representing the manner in which a request originating from a determined zone, for a digital content supplied by said content provider, is redirected to a point of presence of a candidate content distributor, based on said federation margin function;
designating in a routing table, by means of said load distribution indicator, a selected content distributor to which to route a request for said digital content originating from said determined zone.

10. The method as claimed in claim 9, in which the content distribution and load distribution indicators are determined by maximizing the following federation margin function:

$$f = \alpha \lfloor y_{i,1}^p \rfloor - \beta \lfloor x_p^1 \rfloor, \text{ where:}$$

$x_p^1$ is the content distribution indicator relative to the presence of a content $c_1$ in the point of presence;
$y_{i,2}^p$ is the load distribution indicator representing the probability that a request originating from a zone, for a content, be redirected to a point of presence;
$\alpha$ is a matrix whose coefficients depend on at least one technical criterion out of the average bit rate of a content belonging to said content provider, the nubmer of sessions served by said content provider over a determined duration, the distribution of the demand and of the popularity of contents over different zones of the coverage imprint of said content provider;
$\beta$ is a vector whose coefficients depend on the average size of a content belonging to said service provider.

11. An intermediate entity for establishing a content distribution federation between a plurality of content providers and a plurality of content distributors, said entity comprising:
storage means in which are stored a plurality of first parameters supplied by said content providers and a plurality of second parameters supplied by said content distributors, wherein the first parameters comprise, for at least one of said content providers, at least one first technical indicator relative to a technical characteristic concerning a digital content provided by the content provider and wherein the second parameters comprise, for at least one of said content distributors, at least one second technical indicator relative to a technical capability of the content distributor to deliver a digital content;
processing means configured to:
recover the parameters stored in the storage means;
preselect, for at least one of said content providers, at least one candidate content distributor out of said content distributors, based on a comparison between the first and second technical indicators;
select, from the preselected candidate content distributors, at least one content distributor to be associated with at least one content provider; and
associate said at least one of said content providers with the selected at least one of said content distributors, in order to establish a content distribution federation.

12. A digital content distribution system comprising a plurality of content providers, a plurality of content distributors and an intermediate entity for establishing a content distribution federation between the plurality of content providers and the plurality of content distributors, said intermediate entity comprising:
storage means in which are stored a plurality of first parameters supplied by said content providers and a plurality of second parameters supplied by said content distributors, wherein the first parameters comprise, for at least one of said content providers, at least one first technical indicator relative to a technical characteristic concerning a digital content provided by the content provider and wherein the second parameters comprise, for at least one of said content distributors, at least one second technical indicator relative to a technical capability of the content distributor to deliver a digital content;
processing means configured to:
recover the parameters stored in the storage means;
preselect, for at least one of said content providers, at least one candidate content distributor out of said content distributors, based on a comparison between the first and second technical indicators;
select, from the preselected candidate content distributors, at least one content distributor to be associated with at least one content provider; and
associate said at least one of said content providers with the selected at least one of said content distributors, in order to form one or more federations of content distributors, in which:
said content providers are configured to send first parameters to the intermediate entity;
said content distributors are configured to send second parameters to the intermediate entity;
the intermediate entity is configured to associate at least one of said content providers with at least one of said content distributors, based on the received first parameters and the second parameters, in order to establish a content distribution federation.

13. A non-transitory computer-readable memory comprising a computer program comprising code instructions for the implementation of a method for establishing a content distribution federation in a system comprising a plurality of content providers and a plurality of content distributors, when this program is executed by a processor, the method comprising:
supplying first parameters from the content providers to an intermediate entity distinct from said content providers and said content distributors, the first parameters comprising, for at least one of said content providers, at least one first technical indicator relative to a technical characteristic concerning a digital content provided by the content provider;
supplying second parameters from the content distributors to said intermediate entity, the second parameters comprising, for at least one of said content distributors, at least one second technical indicator relative to a technical capability of the content distributor to deliver a digital content;
preselecting, for at least one of said content providers, at least one candidate content distributor out of said content distributors, based on a comparison between the first and second technical indicators; and selecting, from the preselected candidate content distributors, at least one content distributor to be associated with at least one content provider;

associating, by said intermediate entity, said at least one content providers with the selected at least one content distributors; and establishing a content distribution federation of content providers and content distributors, said content distribution federation comprising the associated at least one content providers and selected at least one content distributors.

14. A non-transitory computer-readable storage medium, that can be read by a computer or a data processor, and comprising code instructions of a computer program for the implementation of a method for establishing a content distribution federation in a system comprising a plurality of content providers and a plurality of content distributors, when this program is executed by a processor, the method comprising:

supplying first parameters from the content providers to an intermediate entity distinct from said content providers and said content distributors, the first parameters comprising, for at least one of said content providers, at least one first technical indicator relative to a technical characteristic concerning a digital content provided by the content provider;

supplying second parameters from the content distributors to said intermediate entity, the second parameters comprising, for at least one of said content distributors, at least one second technical indicator relative to a technical capability of the content distributor to deliver a digital content;

preselecting, for at least one of said content providers, at least one candidate content distributor out of said content distributors, based on a comparison between the first and second technical indicators; and selecting, from the preselected candidate content distributors, at least one content distributor to be associated with at least one content provider;

associating, by said intermediate entity, said at least one content providers with the selected at least one content distributors; and establishing a content distribution federation of content providers and content distributors, said content distribution federation comprising the associated at least one content providers and selected at least one content distributors.

\* \* \* \* \*

UNITED STATES PATENT AND TRADEMARK OFFICE
CERTIFICATE OF CORRECTION

PATENT NO. : 10,142,184 B2
APPLICATION NO. : 14/781285
DATED : November 27, 2018
INVENTOR(S) : Ghida Ibrahim et al.

It is certified that error appears in the above-identified patent and that said Letters Patent is hereby corrected as shown below:

In the Specification

In Column 6, Line 54, please replace "Zi" with -- $Z_j$ --.

In Column 9, Line 27, please replace "{CDA′j}" with -- {CDA″j --.

Signed and Sealed this
Twenty-sixth Day of November, 2019

Andrei Iancu
*Director of the United States Patent and Trademark Office*